(12) United States Patent
Yano

(10) Patent No.: US 9,587,348 B2
(45) Date of Patent: Mar. 7, 2017

(54) CLOTHS SEPARATING DEVICE

(71) Applicant: PUREX CO., LTD., Takamatsu-shi, Kagawa (JP)

(72) Inventor: Makoto Yano, Kanoji (JP)

(73) Assignee: PUREX CO., LTD., Takamatsu (JP)

( * ) Notice: Subject to any disclaimer, the term of this patent is extended or adjusted under 35 U.S.C. 154(b) by 30 days.

(21) Appl. No.: 14/760,633

(22) PCT Filed: Jan. 18, 2013

(86) PCT No.: PCT/JP2013/050947
§ 371 (c)(1),
(2) Date: Jul. 13, 2015

(87) PCT Pub. No.: WO2014/112103
PCT Pub. Date: Jul. 24, 2014

(65) Prior Publication Data
US 2015/0361610 A1    Dec. 17, 2015

(51) Int. Cl.
*B65G 47/14* (2006.01)
*D06F 95/00* (2006.01)
(Continued)

(52) U.S. Cl.
CPC .......... *D06F 67/04* (2013.01); *B25J 15/0028* (2013.01); *B65G 37/00* (2013.01); *B66C 1/58* (2013.01); *D06F 95/00* (2013.01)

(58) Field of Classification Search
CPC ....... D06F 67/04; B65G 37/00; B25J 15/0028
(Continued)

(56) References Cited

U.S. PATENT DOCUMENTS 3,134,183 A * 5/1964 Duflot .................... D06C 3/00
                                                 26/105
3,696,942 A * 10/1972 Kitchener et al. ...... D06F 95/00
                                                 294/103.1
(Continued)

FOREIGN PATENT DOCUMENTS

EP          0554204 A1    8/1993
JP       H01-178897 U   12/1989
(Continued)

OTHER PUBLICATIONS

Feb. 3, 2016 Office Action issued in Japanese Patent Application No. 2012-244647.
(Continued)

*Primary Examiner* — Gregory Adams
(74) *Attorney, Agent, or Firm* — Oliff PLC

(57) ABSTRACT

Reduction of time and labor required for manually disentangling the bundle of cloths to some extent beforehand. A cloths separating device for disentangling a bundle of cloths consisting of a plurality of cloths tangled with one another includes: a cloths pick-up mechanism which holds a part of cloths on a cloths transport conveyor and picks the part of cloths, in a hanging state, obliquely upward; a pair of upper and lower compression conveyors, whose entrance is located so as to face a middle part of the cloths picked up in a hanging state, the clearance between the compression conveyors becoming narrower from the entrance toward an exit; and a cloths push-in mechanism which pushes the middle part of the cloths into the entrance of the compression conveyors.

12 Claims, 11 Drawing Sheets

(51) Int. Cl.

| | | |
|---|---|---|
| *B25J 15/00* | (2006.01) | |
| *B65G 49/00* | (2006.01) | |
| *B65G 65/02* | (2006.01) | |
| *D06F 67/04* | (2006.01) | |
| *B66C 1/58* | (2006.01) | |
| *B65G 37/00* | (2006.01) | |

(58) Field of Classification Search
USPC ........... 198/622; 38/143, 7, 8; 414/13; 69/41
See application file for complete search history.

(56) References Cited

U.S. PATENT DOCUMENTS

| | | | | |
|---|---|---|---|---|
| 3,905,593 A | * | 9/1975 | Behn | B65H 45/18 493/17 |
| 3,986,598 A | * | 10/1976 | Grantham | B65G 47/1471 198/445 |
| 4,378,645 A | * | 4/1983 | Allen | D06F 67/04 38/8 |
| 5,079,867 A | * | 1/1992 | Kober | D06F 89/00 223/37 |
| 6,076,291 A | * | 6/2000 | Jensen | D06F 67/04 38/143 |
| 6,089,810 A | * | 7/2000 | Heinz | D06F 95/00 198/455 |
| 6,655,890 B1 | | 12/2003 | Weir | |
| 7,284,667 B2 | * | 10/2007 | Weir | B65G 47/1478 198/455 |
| 7,641,040 B2 | * | 1/2010 | Harris | B65G 47/1471 198/396 |
| 2004/0105736 A1 | * | 6/2004 | Nielsen | B65H 3/00 414/13 |
| 2011/0131844 A1 | * | 6/2011 | Kusunoki | D06F 67/04 38/2 |
| 2012/0099947 A1 | * | 4/2012 | Heinz | D06F 93/00 414/13 |

FOREIGN PATENT DOCUMENTS

| | | |
|---|---|---|
| JP | H05-208100 A | 8/1993 |
| JP | H11-114296 A | 4/1999 |
| JP | 2000-051593 A | 2/2000 |
| JP | 2000-218100 A | 8/2000 |
| JP | 2004-533871 A | 11/2004 |
| JP | 2007-092255 A | 4/2007 |
| WO | 2007/134601 A1 | 11/2007 |

OTHER PUBLICATIONS

Apr. 2, 2013 Search Report issued in International Patent Application No. PCT/JP2013/050947.

Nov. 30, 2015 Search Report issued in European Patent Application No. 13872127.9.

* cited by examiner (a)

(b)

CLOTHS SEPARATING DEVICE

TECHNICAL FIELD

The present invention relates to a cloths separating device which is used in an industrial cloths laundry etc. when supplying washed cloths one by one to a finishing feeder (or a spreader) to feed the cloths to an iron roller, and which serves to disentangle a bundle of cloths consisting of a plurality of cloths tangled with one another.

BACKGROUND ART

One example of known conventional cloths separating devices is the device described in Patent Literature 1. This cloths separating device is equipped with a carriage which moves up and down in the vertical direction, a clamp provided at the lower end of the carriage, an air jet spray mechanism provided in an intermediate part of the hoistway of the carriage, a belt conveyor which has one end facing the air jet spray mechanism across the hoistway of the carriage and rocks in the upper-lower direction, and a tucking roller which is pressed by a spring against the belt of the belt conveyer at the end of the belt conveyor.

Such a conventional cloths separating device works as follows: the carriage is moved down to pick a part of a bundle of cloths inside a laundry container with the clamp; the carriage is moved straight upward to pick up the cloths with the clamp; when the carriage has been moved up to an upper limit position, the clamp releases the cloths and at the same time the air jet spray mechanism sprays air jet onto the cloths to thrust a middle part of the cloths onto the belt conveyor; and the belt conveyor tucks the middle part of the cloths between the tucking roller and the belt conveyor, and sends the cloths to the other end of the belt conveyor while disentangling the cloths by rocking in the upper-lower direction.

CITATION LIST

Patent Literature

Patent Literature 1: Japanese Patent Laid-Open No. 2000-51593

SUMMARY OF INVENTION

Technical Problem

In the above-described conventional cloths separating device, if the cloths in a bundle of cloths inside the laundry container are severely tangled with one another, the cloths may fall due to their heavy weight when the carriage is moved up with the cloths picked up by the clamp. Even when the cloths are picked up, spraying of air jet may fail to thrust the cloths onto the belt conveyor and let the cloths fall, or the cloths may fail to be inserted entirely between the belt conveyor and the tucking roller and cause the belt conveyor to stop due to overload. Accordingly, the bundle of cloths inside the laundry container needs to be disentangled manually to some extent beforehand, which requires time and labor.

Moreover, in the above-described conventional cloths separating device, since the cloths are picked straight upward with the clamp from the bundle of cloths inside the laundry container and a middle part of the cloths is passed onto the belt conveyor, in order to avoid interference with that cloths, the clamp cannot be moved down to pick up the next cloths until the belt conveyor has sufficiently pulled in the cloths it received, which adds to the pick-up cycle time.

Solution to Problem

The present invention aims to solve the problems with the conventional cloths separating device as described above, and provides a cloths separating device which disentangles a bundle of cloths consisting of a plurality of cloths tangled with one another, the cloths separating device including: a cloths pick-up mechanism which holds a part of cloths on a cloths transport conveyor and picks the part of cloths, in a hanging state, obliquely upward; a pair of upper and lower compression conveyors whose entrance is located so as to face a middle part of the cloths picked up in a hanging state, the clearance between the compression conveyors becoming narrower from the entrance toward an exit; a cloths push-in mechanism which pushes the middle part of the cloths into the entrance of the compression conveyors; and a cloths carry-out conveyor which carries out the cloths discharged from the exit of the compression conveyors.

The present invention also provides a cloths separating device which disentangles a bundle of cloths consisting of a plurality of cloths tangled with one another, the cloths separating device including: a cloths pick-up mechanism which holds a part of cloths on a cloths transport conveyor and picks the part of cloths, in a hanging state, obliquely upward; a pair of upper and lower compression conveyors whose entrance is located so as to face a middle part of the cloths picked up in a hanging state, the clearance between the compression conveyors becoming narrower from the entrance toward an exit; and a cloths push-in mechanism which pushes the middle part of the cloths into the entrance of the compression conveyors.

Effects of Invention

In the cloths separating device of the present invention, the cloths pick-up mechanism holds a part of cloths on the cloths transport conveyor and picks the cloths obliquely upward in a hanging state, and the cloths push-in mechanism pushes a middle part of the cloths into the entrance of the pair of upper and lower compression conveyors, of which the entrance is located so as to face the middle part of the cloths picked up in a hanging state, the clearance between the compression conveyors becoming narrower from the entrance toward the exit, and the cloths carry-out conveyor carries out the cloths discharged from the exit of the compression conveyors.

Therefore, according to the cloths separating device of the present invention, it is possible to automatically disentangle and carry out a bundle of cloths consisting of a plurality of cloths tangled with one another on the cloths transport conveyor, so that the time and labor required for manually disentangling the bundle of cloths to some extent beforehand can be reduced. Moreover, since the cloths pick-up mechanism picks the cloths obliquely upward in a hanging state, the cloths pick-up mechanism can move down the clamp to pick up the next cloths without interfering with any cloth that may remain hanging at the entrance of the compression conveyors, so that the pick-up cycle time can be reduced.

In the cloths separating device of the present invention, it is preferable that the cloths pick-up mechanism includes: a plurality of clamps which are arrayed in the width direction of the cloths transport conveyor and open and close respective grabbing parts; a clamp hoisting mechanism which moves a mobile member, on which the plurality of clamps are mounted, up and down in an obliquely upper-lower direction; and a clamp height changing mechanism which changes the height at which each of the plurality of clamps is mounted on the mobile member. Thus, since the clamping height can be changed according to the height of the cloths at a portion facing each clamp, it is possible to hold the cloths at a plurality of portions with the grabbing parts and thereby to increase the success rate of picking up the cloths. Moreover, it is possible to reliably hold the cloths with the grabbing part of any of the clamps, at whichever position the cloths are located in the width direction of the cloths transport conveyor, so that the success rate of picking up the cloths can be increased from this aspect as well.

In the cloths separating device of the present invention, it is preferable that the grabbing part has a frame-shaped protruding strip portion which is annularly closed or partially open. Thus, since a part of the cloths held by the protruding strip portion of the grabbing part can be released to the inside of the frame-shaped protruding strip portion, it is possible for the part of the cloths released to the inside to engage with the protruding strip portion so as to prevent the cloths being held from falling away.

In the cloths separating device of the present invention, it is preferable that an exit-side roller which supports the conveyor belt of the upper compression conveyor of the pair of upper and lower compression conveyors can move up and down, and that the upper compression conveyor is provided with belt urging means for urging the conveyor belt by means of the exit-side roller toward the lower compression conveyor. Thus, even when the cloths are thin or the amount of cloths is small, it is possible to bring the upper compression conveyor closer to the lower compression conveyor by urging the upper compression conveyor toward the lower compression conveyor, and send out the cloths from the exit side while firmly compressing the cloths against the lower compression conveyor. Even when the cloths are thick or the amount of cloths is large, it is possible to urge the upper compression conveyor toward the lower compression conveyor to thereby separate the upper compression conveyor from the lower compression conveyor by a reaction force from the cloths, so that clogging with cloths between the upper and lower compression conveyors can be prevented.

In the cloths separating device of the present invention, it is preferable that the cloths separating device further includes a cloths rear end pull-up mechanism which pulls up the rear end of the cloths picked up in a hanging state and separates the cloths from the cloths pick-up mechanism. Thus, since the cloths rear end pull-up mechanism pulls up the rear end of the cloths picked up in a hanging state and separates the cloths from the cloths pick-up mechanism, the clamps of the cloths pick-up mechanism can move down to pick up the next cloths while more reliably avoiding interference with any cloth that may remain hanging at the entrance of the compressor conveyors, so that the pick-up cycle time can be further reduced.

BRIEF DESCRIPTION OF DRAWINGS

FIG. 9(*b*) is a front view showing a protruding strip portion of the grabbing part of the clamp as seen from the direction of the arrow in FIG. 9(*a*); and FIG. 9(*c*) is a side view showing the above clamp in a state where the grabbing part is closed and cloths are held in it.

DESCRIPTION OF EMBODIMENTS

Figure 1:
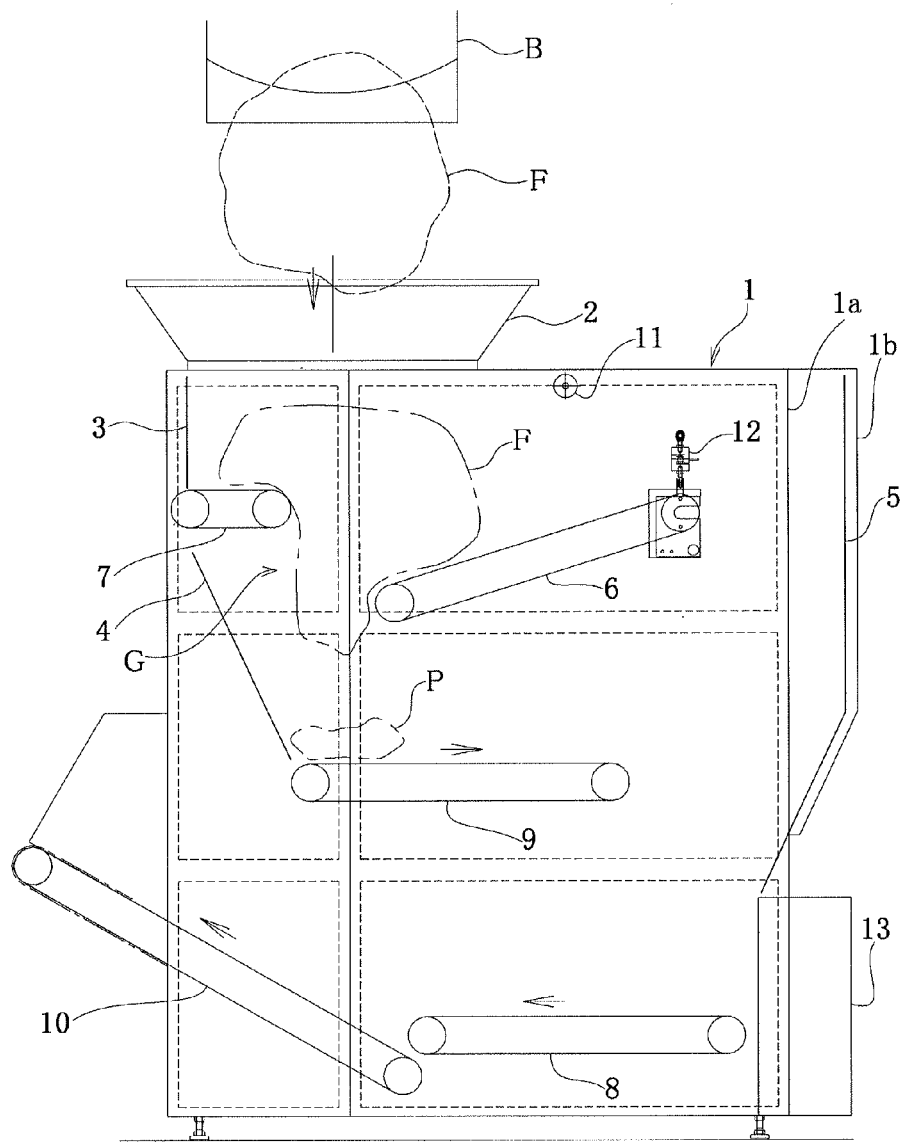
FIG. 1 is a schematic transparent diagram showing the configuration of a reference example of a cloths separating device of the present invention.

In the following, the present invention will be described in detail on the basis of the drawings and by means of a reference example and an embodiment. FIG. 1 is a schematic transparent diagram showing the configuration of the reference example of a cloths separating device of the present invention. In FIG. 1, the reference sign 1 denotes a casing, 2 denotes a funnel-shaped hopper, 3, 4, and 5 denote guide plates which guide falling cloths.

The cloths separating device of this reference example is also used in an industrial cloths laundry etc. when supplying washed cloths one by one to a finishing feeder to feed the cloths to an iron roller, and serves to disentangle a bundle of cloths consisting of a plurality of cloths tangled with one another. The casing 1 in this example has a frame 1*a* having a substantially cuboid frame shape which extends in the upper-lower and left-right directions in FIG. 1, and a side plate 1*b* which entirely covers side parts of the frame 1*a* in the front-rear direction in FIG. 1. The hopper 2 is disposed at the upper end of the casing 1 on one side, which is the left side in FIG. 1, and is fixed on the frame 1*a*.

The guide plate 3 is fixed on the frame 1*a* and the side plate 1*b* so as to cover the opening of the frame 1*a* in an upper part of the casing 1 on the side where the hopper 2 is provided, which is the left side in FIG. 1. The guide plate 4 is fixed on the frame 1*a* and the side plate 1*b* under the guide plate 3 so as to incline and come closer toward the center as it extends downward. The guide plate 5 is fixed on the frame 1a and the side plate 1b so as to cover the opening of the frame 1a, from an upper part to a lower part of the casing 1, on the side opposite to the side where the hopper 2 is provided, which is the right side in FIG. 1, and so as to incline and come closer to the center as it extends downward.

A transport bag B is transported and stopped above the hopper 2 by a transport system (not shown). This transport bag B contains a large number of, for example, about 80 cloths such as sheets, which have been washed in a continuous washing machine, dehydrated in a dehydrator, and dried to a semi-dried state in a dryer, tangled with one another in a bundle. The lower end of the transport bag B is normally closed with a drawstring, and when the drawstring is loosened through an operation of a worker etc., the transport bag B is opened and a bundle of cloths F inside the transport bag B falls into the hopper 2.

In an upper part of the inside of the casing 1, two belt conveyors, a main detangling conveyor 6 and a preliminary detangling conveyor 7, are installed. The main detangling conveyor 6 extends at a slant in a central part of the inside of the casing 1 so that one end of the main detangling conveyor 6, which is the left end in FIG. 1, is located under the hopper 2 and the other end, which is the right end in FIG. 1, is located at a higher position than the left end. As shown in FIG. 1, the bundle of cloths F is fed from the hopper 2 so as to get caught on the left end of the main detangling conveyor 6, and the main detangling conveyor 6 lifts up and transports the bundle of cloths F toward the right end, which is to the right side in FIG. 1, and performs main detangling of breaking up and detangling the bundle of cloths F under its own weight as will be described later.

The preliminary detangling conveyor 7 is shorter than the main detangling conveyor 6, and extends substantially horizontally at the left end of the inside of the casing 1 in FIG. 1 so as to be located obliquely above the main detangling conveyor 6 with one end of the preliminary detangling conveyor 7, which is the right end in FIG. 1, lying adjacent to the lower side of the hopper 2 and the left end of the main detangling conveyor 6. The bundle of cloths F is fed from the hopper 2 so as to partially get caught on the right end of the preliminary detangling conveyor 7, and the preliminary detangling conveyor 7 functions as a preliminary detangling member which performs preliminary detangling through collision with the bundle of cloths F, as well as functions to transport a part of the bundle of cloths F lying on the preliminary detangling conveyor 7 to the right side in FIG. 1 during preliminary detangling to transfer the part of the bundle of cloths F onto the main detangling conveyor 6. Between the right end of this preliminary detangling conveyor 7 and the left end of the main detangling conveyor 6, a gap G is left in the horizontal direction which allows passage of a certain amount of cloths which is smaller than the whole bundle of cloths F as it has initially fallen.

In a lower part of the inside of the casing 1, a cloths transport conveyor 8 which transports cloths P, which are detangled from the initially-fallen bundle of cloths F and fall from the right end in FIG. 1 of the main detangling conveyor 6, to the left side in FIG. 1 is installed so as to extend substantially horizontally. Inside the casing 1, an intermediate conveyor 9, of which one end, the left end in FIG. 1, is located under the gap G and which transports the cloths P, which are detangled from the initially-fallen bundle of cloths F and fall through the gap G, to the right side in FIG. 1 and supplies the cloths P to the cloths transport conveyor 8, is installed so as to extend substantially horizontally. The left end in FIG. 1 of the cloths transport conveyor 8 is connected with the right end of a cloths carry-out conveyor 10, and this cloths carry-out conveyor 10 extends at a slant so that its left end is located at a higher position than the right end and protrudes to the outside of the frame 1a.

Further, in the cloths separating device of this reference example, a limiting roller 11, which limits the passage of an excessively large bundle of cloths F, is rotatably installed in a central part at the upper end of the frame 1a so as to extend horizontally in the front-rear direction in FIG. 1. The main detangling conveyor 6 in this example has the left end pivotally supported on the frame 1a and can rock in the upper-lower direction, and a common load cell 12 is inserted between the right end of the main detangling conveyor 6 and the frame 1a. A control panel 13, which is equipped with a controller (not shown) having a common computer, is provided in a lower part of the casing 1 on the right side in FIG. 1. The controller operates based on a given program, and a signal from the load cell 12 which continuously indicates the weight of the bundle of cloths F on the main detangling conveyor 6 is input into the controller, and the controller controls the operation of a driving motor (not shown) of the above-described conveyors 6 to 10.

Figure 2:
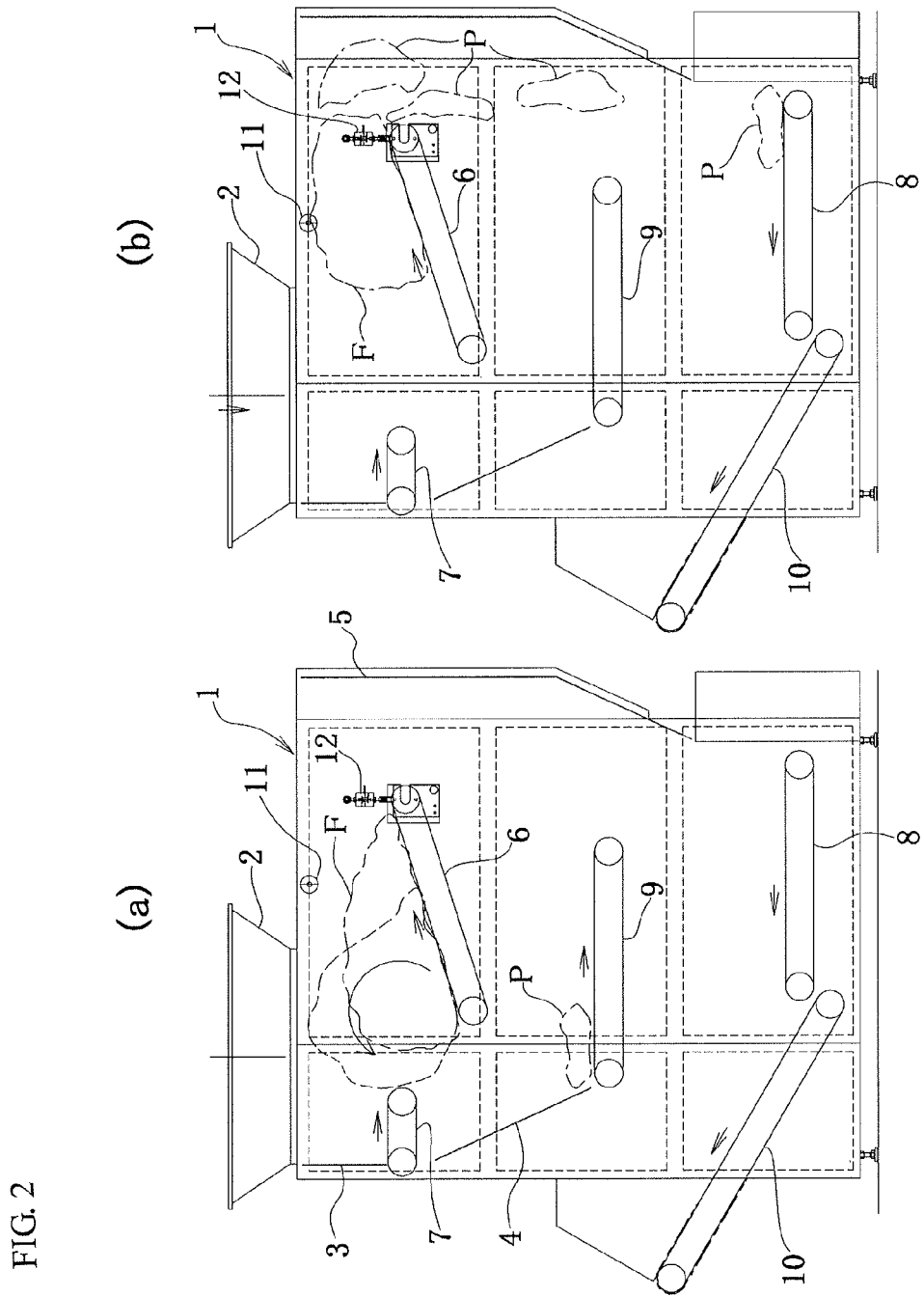
FIGS. 2(*a*) and 2(*b*) are explanatory diagrams sequentially illustrating actions of the cloths separating device of the above reference example.

FIG. 2(a) and FIG. 2(b) are explanatory diagrams sequentially illustrating the actions of the cloths separating device of the reference example. FIG. 3(a) and FIG. 3(b) are explanatory diagrams sequentially illustrating the further actions of the cloths separating device of the reference example. In the cloths separating device of this reference example, as shown in FIG. 1, when the bundle of cloths F falls from the transport bag B through the hopper 2 to be fed into the cloths separating device, first, a part of the bundle of cloths F gets caught on the right end of the preliminary detangling conveyor 7, and the preliminary detangling conveyor 7 performs preliminary detangling through collision with the bundle of cloths F, and slowly transports the part of the bundle of cloths F lying on the preliminary detangling conveyor 7 to the right side in FIG. 1 and transfers it onto the main detangling conveyor 6. Immediately after the part of the bundle of cloths F gets caught on the right end of the preliminary detangling conveyor 7, a large part of the bundle of cloths F falls onto the left end of the main detangling conveyor 6, while the cloths P, which is a remaining part of the bundle of cloths F, falls onto the intermediate conveyor 9 through the gap G due to the momentum of the falling bundle of cloths F.

Next, as shown in FIG. 2(a), the main detangling conveyor 6 lifts up and transports the bundle of cloths F on the conveyor belt slowly to the obliquely upper side, and during the transportation, the initially-fallen bundle of cloths F is detangled while rolling to the left side under its own weight as indicated by the arrow in FIG. 2(a). As shown in FIG. 2(b), the cloths P, which is detangled and separated from the bundle of cloths F, fall little by little from the right end of the main detangling conveyor 6 onto the cloths transport conveyor 8, and are transported while being evened out so as not to gather by the cloths transport conveyor 8. If the bundle of cloths F on the conveyor belt of the main detangling conveyor 6 is still too large, the limiting roller 11 engages with an upper part of the bundle of cloths F so as to limit the passage as well as to facilitate the detangling. On the basis of a signal from the load cell 12, which continuously indicates the weight of the bundle of cloths F on the main detangling conveyor 6, the controller of the control panel 13 facilitates the progression of detangling of the bundle of cloths F under its own weight by reducing the operation speed of the main detangling conveyor 6 or repeatedly stopping and starting the operation so that the weight of the bundle of cloth F on the main detangling conveyor 6 decreases by degrees.

An optical sensor (not shown) connected with the controller of the control panel 13 is installed in the vicinity of the right end of the intermediate conveyor 9. When the controller detects by means of a signal from this optical sensor that there are the cloths P on the intermediate conveyor 9, as shown in FIG. 3(*a*), the controller controls so as to reduce the operation speed of the intermediate conveyor 9 or repeatedly stop and start the operation so that the cloths P on the intermediate conveyor 9 falls onto the cloths transport conveyor 8 at a timing between falls of the cloths P from the bundle of cloths F on the main detangling conveyor 6 onto the cloths transport conveyor 8.

Figure 3:
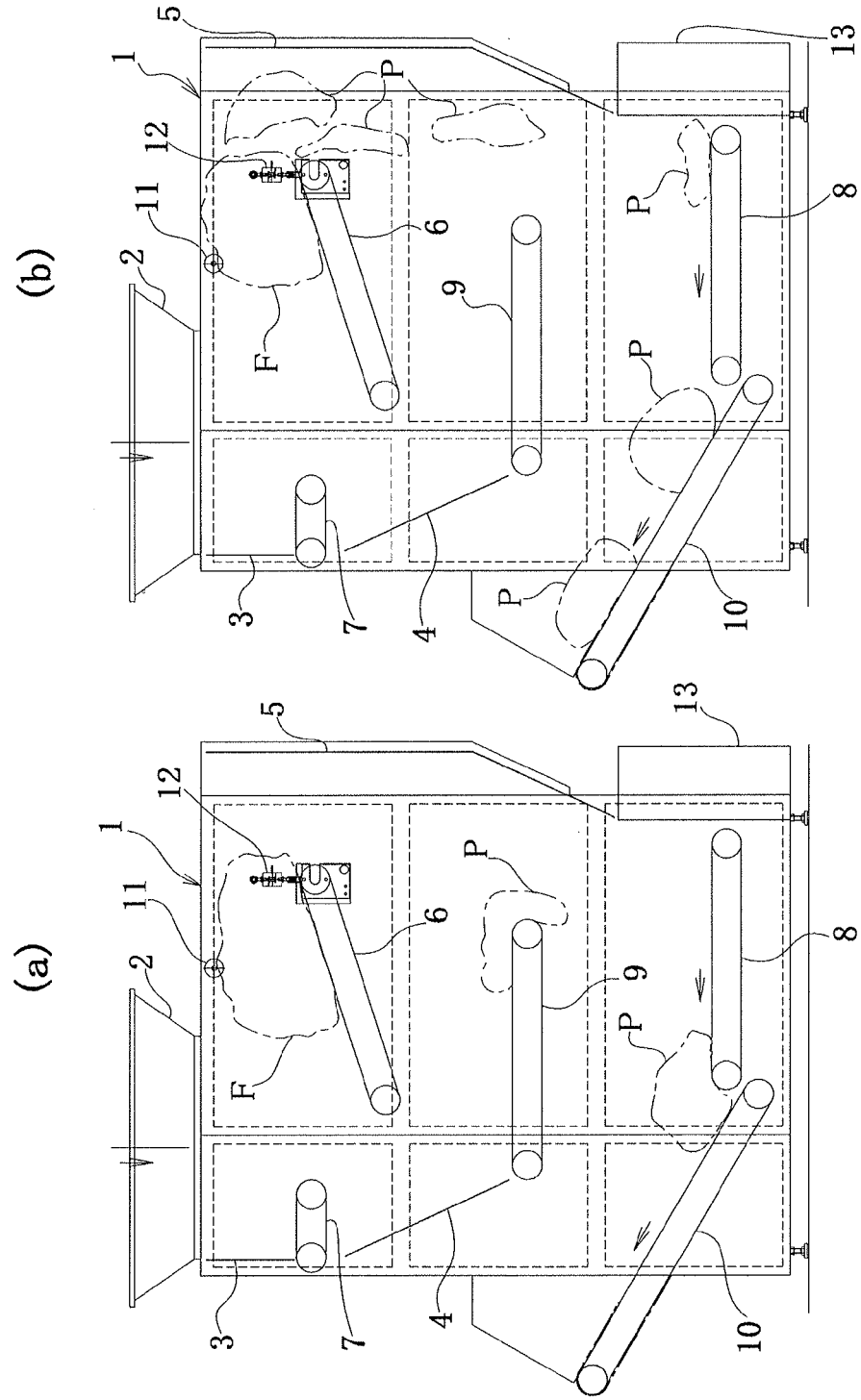
FIGS. 3(*a*) and 3(*b*) are explanatory diagrams sequentially illustrating further actions of the cloths separating device of the above reference example.

In this example, as shown in FIG. 3(*b*), the cloths P evened out and falling onto the cloths transport conveyor 8 are passed onto the conveyor belt of the cloths carry-out conveyor 10 substantially evenly or by about tens, and are sequentially carried to the outside of the casing 1 by the cloths carry-out conveyor 10.

Therefore, according to the cloths separating device of this reference example, it is possible to automatically disentangle the bundle of cloths F consisting of a plurality of cloths tangled with one another and carry out the cloths substantially evenly or by about tens, so that the time and labor required for manually disentangling the bundle of cloth to some extent beforehand can be reduced.

According to the cloths separating device of this reference example, the cloths separating device is equipped with the preliminary detangling conveyor 7 which is located adjacent to one end of the main detangling conveyor 6 and serves as a preliminary detangling member onto which the bundle of cloths F is fed so as to partially get caught on the conveyor and which performs preliminary detangling through collision with the bundle of cloths. Thus, as the impact of preliminary detangling through collision with the preliminary detangling conveyor 7 makes the bundle of cloths F easy to detangle, the main detangling thereafter can be performed easily and reliably.

According to the cloths separating device of this reference example, since the preliminary detangling member is the preliminary detangling conveyor 7 which transports the bundle of cloths F toward one end of the main detangling conveyor 6, it is possible to transfer the bundle of cloths F lying on the preliminary detangling conveyor 7 onto the main detangling conveyor 6 during preliminary detangling.

Further, according to the cloths separating device of this reference example, the cloths separating device is equipped with the cloths transport conveyor 8 which is located under the right end of the main detangling conveyor 6 and transports the cloths P, which are detangled from the bundle of cloths F and fall from the right end of the main detangling conveyor 6, and with the intermediate conveyor 9 which is located under the gap G spaced in the horizontal direction between the preliminary detangling conveyor 7 and the main detangling conveyor 6 and supplies the cloths P, which are detangled from the bundle of cloths F and fall through the gap G, to the cloths transport conveyor 8. Thus, by supplying the cloths P, which fall through the gap G, to the cloths transport conveyor 8 in a timely manner by the intermediate conveyor 9, it is possible to transport the cloths P detangled from the bundle of cloths F and falling from the main detangling conveyor 6 onto the cloths transport conveyor 8 and the cloths P falling through the gap G by the cloths transport conveyor 8, while evening out the cloths P so as not to gather in one place.

Figure 4:
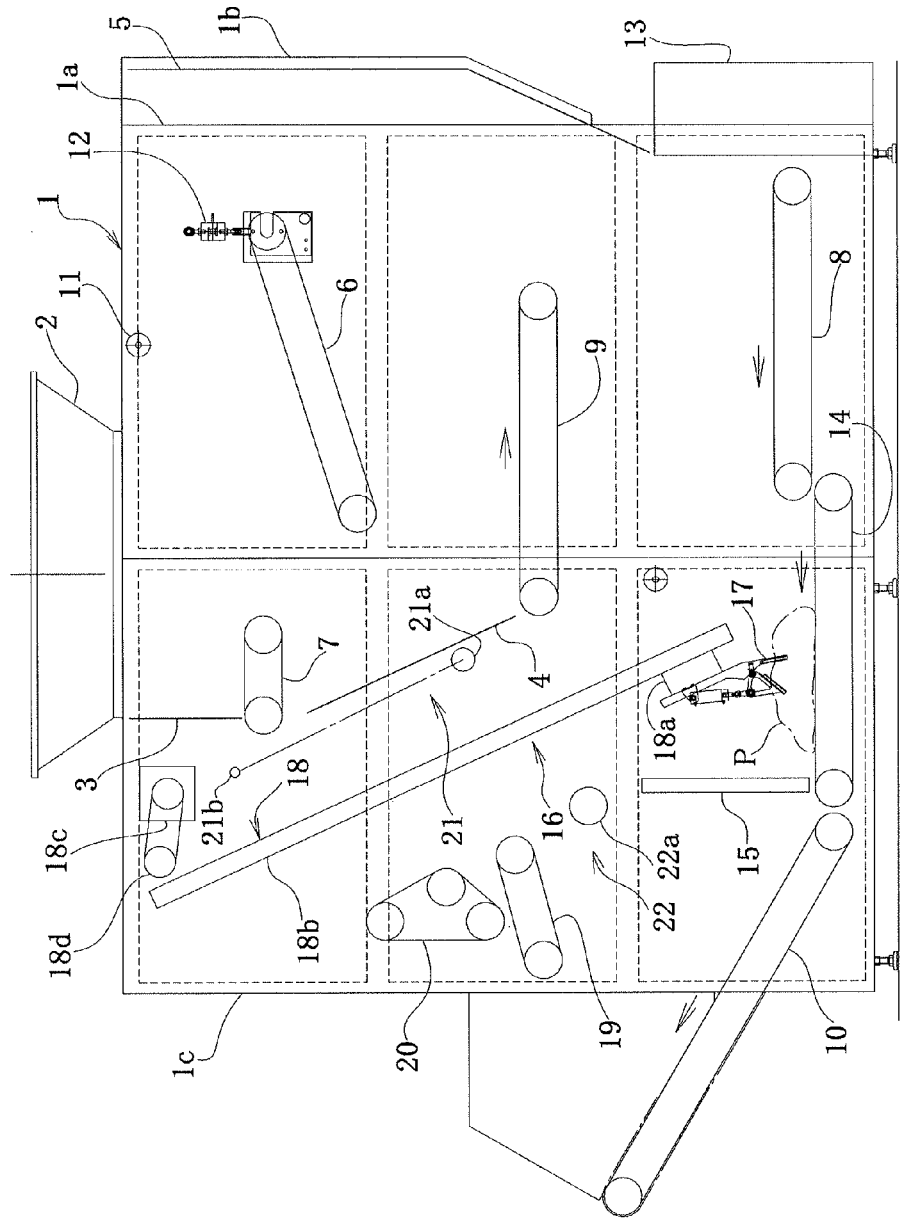
FIG. 4 is a schematic transparent diagram showing the configuration of an embodiment of a cloths separating device of the present invention.

FIG. 4 is a schematic transparent diagram showing the configuration of an embodiment of the cloths separating device of the present invention. In addition to the same configuration as the foregoing reference example, the cloths separating device of this embodiment has, as will be described later, a cloths pick-up mechanism 16, a pair of upper and lower compression conveyors 19, 20, a cloths push-in mechanism 21, and a cloths rear end pull-up mechanism 22 on the downstream of the cloths transport conveyor 8, in order to further detangle the cloths P and carry out the cloths P by the cloths carry-out conveyor 10. In FIG. 4, the same parts as those of the foregoing reference example are assigned the same reference signs.

That is, in the cloths separating device of this embodiment, a part on the left side in FIG. 4 of the frame 1*a* of the casing 1 in the same configuration as the foregoing reference example is changed into a larger frame 1*c*, and the side plate 1*b* is adapted to the frame 1*c*. In front of the cloths carry-out conveyor 10, which protrudes at a slant from the frame 1*c*, another cloths transport conveyor 14 being a belt conveyor is installed which is connected with the cloths transport conveyor 8 in the same configuration as the foregoing reference example and transports the cloths P received from the cloths transport conveyor 8 to the left side in FIG. 4, and a partition plate 15 is provided upright at the left end in FIG. 4 of the cloths transport conveyor 14.

The cloths pick-up mechanism 16 is provided inside the frame 1*c*. This cloths pick-up mechanism 16 is equipped with two clamps 17 which are located side by side in the front-rear direction in FIG. 4 and are driven by an air cylinder, for example, to hold and release a part of the cloths P, and a slide mechanism 18 which moves up and down these clamps 17 in an obliquely upper-lower direction. The slide mechanism 18 has two sliders 18*a* which are located side by side in the front-rear direction in FIG. 4 and support the two clamps 17 respectively, two guide rails 18*b* which are located side by side in parallel to each other in the front-rear direction in FIG. 4 and guide the upward and downward motion of the sliders 18*a* in the obliquely upper-lower direction, a motor 18*c* which drives the upward and downward motion of the sliders 18*a* in combination in the obliquely upper-lower direction, and a transmission mechanism 18*d* of a belt type, for example, which transmits the driving force of the motor 18*c* to the sliders 18*a*. The cloths P on the cloths transport conveyor 14 can be picked obliquely upward in a hanging state by holding a part of the cloths P on the cloths transport conveyor 14 with the two clamps 17 and moving these clamps 17 obliquely upward by the slide mechanism 18.

Inside the frame 1*c*, the compression conveyors 19, 20 are further provided. The conveyor belt of the lower compression conveyor 19 is inclined slightly downward from the entrance-side end, which is the right end in FIG. 4, toward the exit-side end, while the conveyor belt of the upper compression conveyor 20, which is wound around three rollers, is inclined steeply downward from the entrance-side end, which is the right end in FIG. 4, toward the exit-side end. Thus, the entrance-side end of the compression conveyors 19, 20 is located so as to face a middle part of the cloths P picked up in a hanging state, and the clearance between the compression conveyors 19, 20 becomes narrower from the entrance-side end toward the exit-side end.

Inside the frame 1*c*, the cloths push-in mechanism 21 is further provided. This cloths push-in mechanism 21 supports a rotatable push-in roller 21*a*, which extends horizontally in the front-rear direction in FIG. 4, by a support arm (not shown) which is swingable around a support shaft 21*b* on the upper side. The cloths push-in mechanism 21 can push a middle part of the cloths P in a hanging state into the entrance of the compression conveyors 19, 20 by pushing and pulling the push-in roller 21*a* by an air cylinder (not shown), for example, so as to swing around the support shaft 21*b* through the gap between the two guide rails 18*b*.

The cloths rear end pull-up mechanism 22 is provided between the entrance of the compression conveyors 19, 20 and the upper end of the partition plate 15. This cloths rear end pull-up mechanism 22 can separate the rear end of the cloths P from the cloths pick-up mechanism 16 by rotating a pull-up roller 22*a*, which extends horizontally in the front-rear direction in FIG. 4, in the counterclockwise direction in the figure by a motor (not shown) and thereby pulling up the rear end lying on the pull-up roller 22*a* of the cloths P, which is picked up by the cloths pick-up mechanism 16 in a hanging state, and dropping the rear end to the left side in FIG. 4 of the pull-up roller 22*a*.

Figure 5:
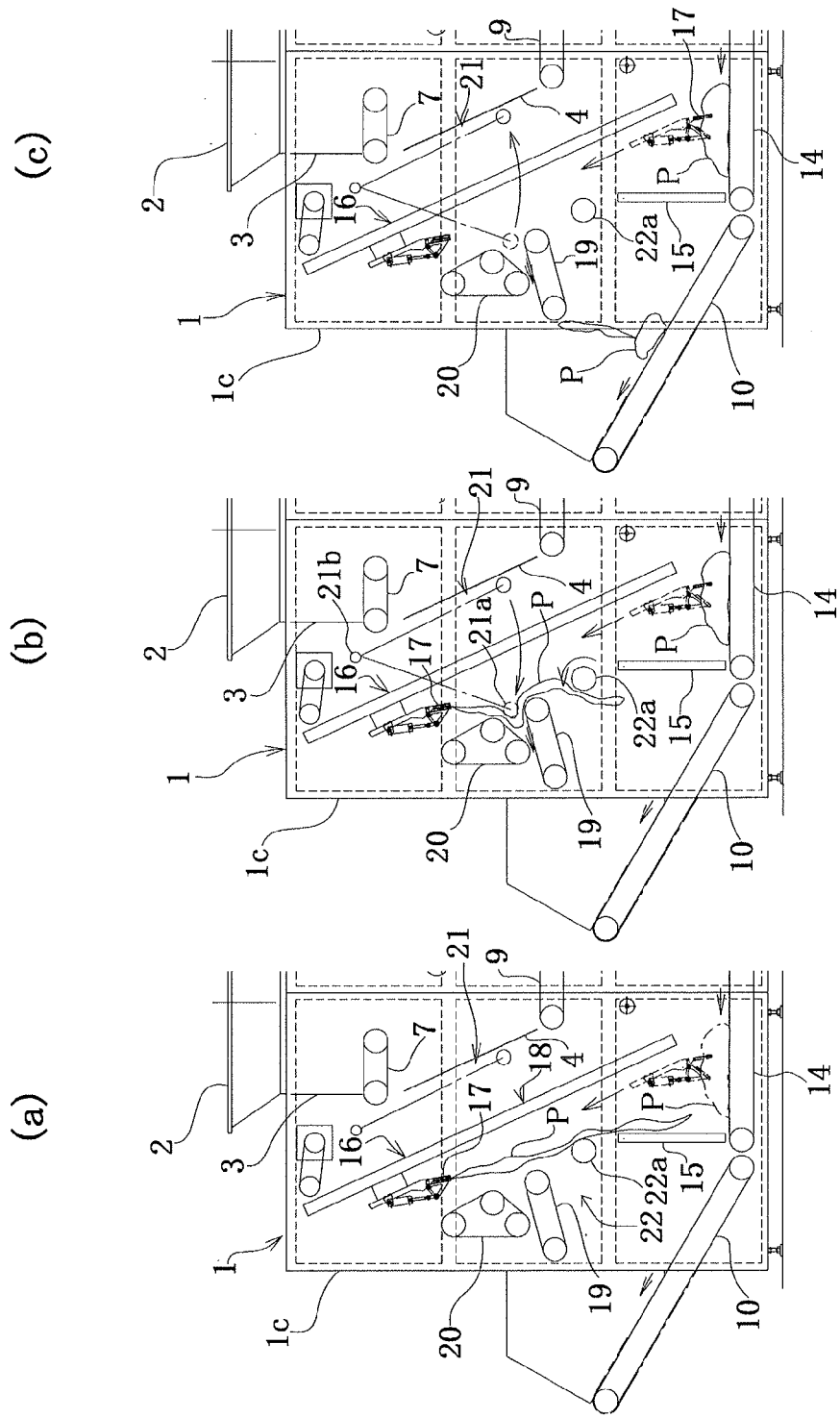
FIGS. 5(*a*), 5(*b*), and 5(*c*) are explanatory diagrams sequentially illustrating actions of the cloths separating device of the above embodiment.

FIGS. 5(*a*), 5(*b*), and 5(*c*) are explanatory diagrams sequentially illustrating the actions of the cloths separating device of the embodiment. In the cloths separating device of the embodiment, in the same manner as the foregoing reference example, the bundle of cloths F fed from the hopper 2 is preliminarily detangled by the preliminary detangling conveyor 7 and mainly detangled by the main detangling conveyor 6, and the cloths P detangled from the bundle of cloths F and falling from the main detangling conveyor 6 onto the cloths transport conveyor 8 and the cloths P falling through the gap G are evened out so as not to gather in one place and sequentially transported by the cloths transport conveyor 8 and the cloths transport conveyor 14 substantially evenly or by about tens.

Then, in the cloths separating device of this embodiment, as shown in FIG. 5(*a*), the cloths pick-up mechanism 16 holds a part (about one to three pieces) of the cloths P on the cloths transport conveyor 14 with the two clamps 17, and moves the clamps 17 obliquely upward by the slide mechanism 18 to pick the part of the cloths P on the cloths transport conveyor 14 obliquely upward in a hanging state. As shown in FIG. 5(*b*), the cloths push-in mechanism 21 swings the push-in roller 21*a* to the left side in FIG. 5(*b*) through the gap between the two guide rails 18*b* so that the push-in roller 21*a* pushes a middle part of the cloths P in a state of hanging from the two clamps 17 into the entrance of the compression conveyors 19, 20. The compression conveyors 19, 20 tuck the cloths P, which is pushed in by the push-in roller 21*a*, between the conveyor belts and send the cloths P to the exit on the left side in FIG. 5, while the cloths rear end pull-up mechanism 22 pulls up the rear end, namely, the lower end, of the cloths P by the pull-up roller 22*a* and separates the lower end of the cloths P from the cloths pick-up mechanism 16. Thus, as shown in FIG. 5(*c*), the cloths P fall from the exit of the compression conveyors 19, 20 onto the cloths carry-out conveyor 10, and are carried out by the cloths carry-out conveyor 10. Meanwhile, the slide mechanism 18 moves the clamps 17 obliquely downward to hold the next cloths, and the cloths push-in mechanism 21 swings the push-in roller 21*a* to the right side in FIG. 5(*c*) to return it to the original position.

Thus, according to the cloths separating device of this embodiment, in the same manner as the foregoing reference example, it is possible to automatically disentangle the bundle of cloths F consisting of a plurality of cloths tangled with one another and carry out the cloths substantially evenly or by about tens, so that the time and labor required for manually disentangling the bundle of cloths to some extent beforehand can be reduced.

Further, according to the cloths separating device of this embodiment, the cloths pick-up mechanism 16 holds a part of the cloths P on the cloths transport conveyor 14 and picks the cloths P obliquely upward in a hanging state, and the cloths push-in mechanism 21 pushes a middle part of the cloths P into the entrance of the pair of upper and lower compression conveyors 19, 20, of which the entrance is located so as to face the middle part of the cloths P picked up in a hanging state, the clearance between the compression conveyors becoming narrower from the entrance toward the exit, and the cloths carry-out conveyor 10 sequentially carries out the cloths P discharged from the exit of the compression conveyors 19, 20. Thus, it is possible to further detangle the cloths P on the cloths transport conveyor 14 and carry out the cloths P by about ones to threes or by about tens by the cloths carry-out conveyor 10. Moreover, since the cloths pick-up mechanism 16 picks the cloths P obliquely upward in a hanging state, the cloths pick-up mechanism 16 can move down to pick up the next cloths P without interfering with any cloth P that may remain hanging at the entrance of the compression conveyors 19, 20, so that the pick-up cycle time can be reduced.

Further, according to the cloths separating device of this embodiment, since the cloths rear end pull-up mechanism 22 pulls up the rear end, namely, the lower end, of the cloths P picked up in a hanging state and separates the rear end of the cloths P from the cloths pick-up mechanism 16, the clamps 17 of the cloths pick-up mechanism 16 can move down to pick up the next cloths P while more reliably avoiding interference with any cloth P that may remain hanging at the entrance of the compression conveyors 19, 20, so that the pick-up cycle time can be further reduced.

Figure 6:
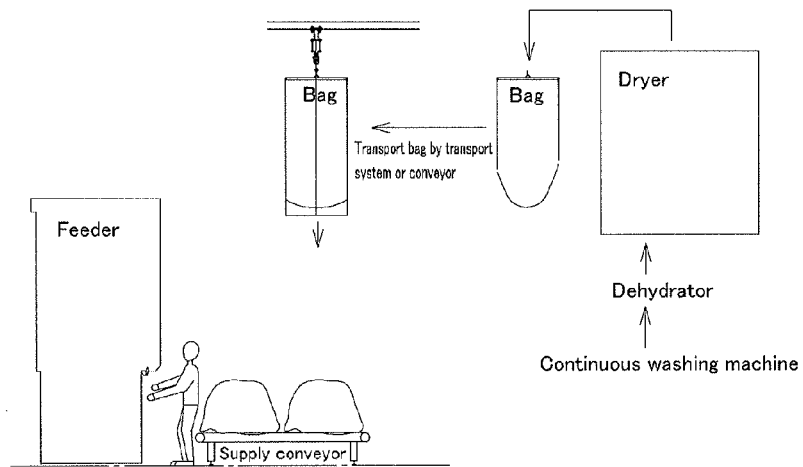
FIGS. 6(*a*) and 6(*b*) are explanatory diagrams illustrating a conventional method and a method using the cloths separating device of the above embodiment, respectively, for feeding washed cloths one by one to an iron roller.
Figure 6:
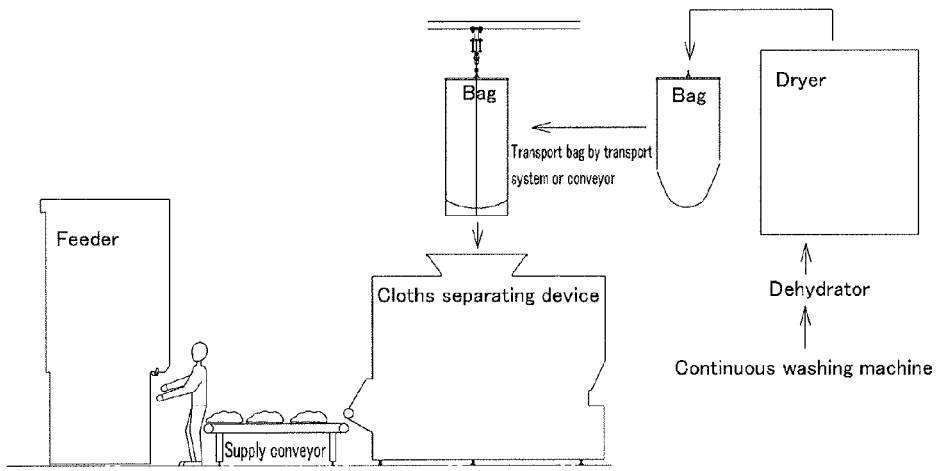

FIGS. 6(*a*) and 6(*b*) are explanatory diagrams illustrating a conventional method and a method using the cloths separating device of the embodiment, respectively, for feeding washed cloths one by one to an iron roller. In the conventional method which does not use the cloths separating device, as shown in FIG. 6(*a*), used cloths collected from contracted facilities such as hospitals and accommodation facilities like hotels are first washed in a continuous washing machine, then dehydrated in a dehydrator, and then dried to a semi-dried state in a dryer, and put into a transport bag, for example, by about 80 s, in a state of being tangled with one another in a bundle. The transport bag is transported by a transport system to the vicinity of a finishing feeder (or a spreader), where the lower end of the transport bag is released and the bundle of cloths inside the transport bag are stacked in the vicinity of the finishing feeder (or the spreader), or the cloths which have been dried to a semi-dried state in a dryer are transported by a conveyor and stacked in the vicinity of the finishing feeder (or the spreader), and a worker pulls out the cloths one by one from the stack of cloths and supplies the cloths to the finishing feeder (or the spreader).

By contrast, when the cloths separating device of the embodiment is used, as shown in FIG. 6(*b*), used cloths collected from contracted facilities such as hospitals and accommodation facilities like hotels are first washed in a continuous washing machine, then dehydrated in a dehydrator, and then dried to a semi-dried state in a dryer, and put into a transport bag, for example, by about 80 s, in a state of being tangled with one another in a bundle. The transport bag is transported by a transport system to above the cloths separating device of the embodiment, where the lower end of the transport bag is released and the bundle of cloths inside the transport bag is fed into the cloths separating device. The cloths separating device disentangle the bundle of cloths consisting of a plurality of cloths tangled with one another and supplies the cloths to the vicinity of the finishing feeder (or the spreader), and a worker pulls out the cloths one by one from the plurality of cloths, which have been disentangled and divided into small amounts, and supplies the cloths to the finishing feeder (or the spreader).

Figure 7:
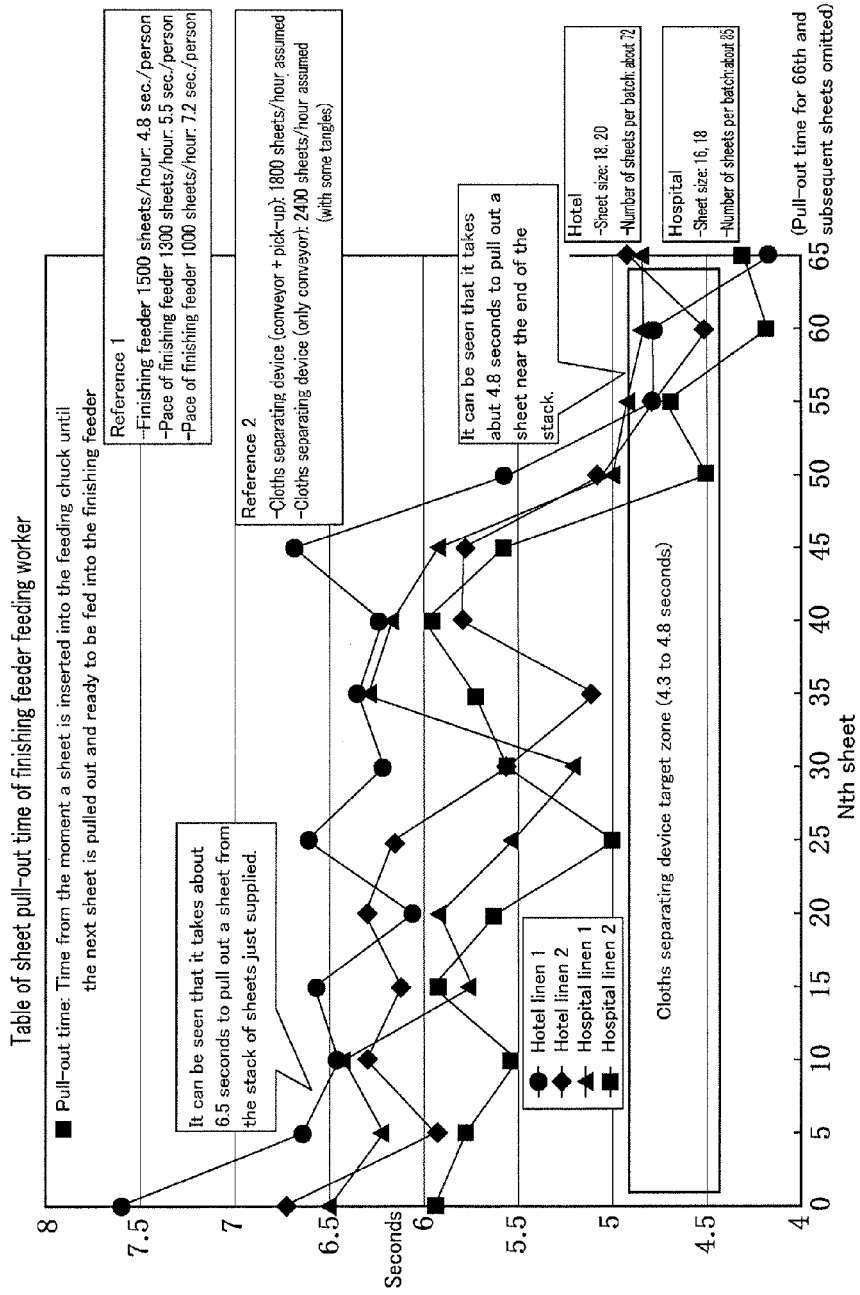
FIG. 7 is a relation diagram showing changes in a sheet pull-out time with work progress when sheets as washed cloths are pulled out one by one from a bundle of sheets and fed into a finishing feeder by the conventional method shown in FIG. 6(*a*).

FIG. 7 is a relation diagram showing changes in actual sheet pull-out time with work progress when sheets as washed cloths are pulled out one by one from a bundle of sheets and fed into a finishing feeder by the conventional method shown in FIG. 6(a). Here, four types of sheets: hotel linens 1, 2 and hospital linens 1, 2 are handled, and the time from the moment a sheet is inserted into the feeding chuck of the finishing feeder (or the spreader) until the next sheet is pulled out from the stack and is ready to be fed into the finishing feeder (or the spreader) is measured as the pull-out time. In FIG. 7, the cloths separating device (only conveyor) represents the device of the reference example, and the cloths separating device (conveyor+pick-up) represents the device of the embodiment. The numbers of the sheet size represent the widths of the sheets (×100 mm), and the sheets are roughly 3000 mm long.

As is clear from FIG. 7, when the finishing feeder (or the spreader) operates at the rate of 1000 sheets per hour, each worker feeds the sheets at a 7.2-second interval, when the operation rate is 1300 sheets per hour, each worker feeds the sheets at a 5.5-second interval, and when the operation rate is 1500 sheets per hour, each worker feeds the sheets at a 4.8-second interval, while the device of the reference example assumes carrying out 2400 sheets per hour (with some tangles) and the device of the embodiment assumes carrying out 1800 sheets per hour. Thus, since each worker can feed the sheets at a 4.3- to 4.8-second interval, it is sufficiently possible to accommodate the operation of the finishing feeder (or the spreader) at the rate of 1500 sheets per hour.

As is also clear from FIG. 7, it takes about 6.6 seconds of pull-out time to pull out a sheet from the stack of sheets just supplied, while the sheet pull-out time for pulling out a sheet decreases to about 4.8 seconds near the end of the stack. According to the cloths separating devices of the reference example and the embodiment, it is possible to achieve a pull-out time equal to or shorter than the pull-out time near the end of the stack, so that the speed per unit time of feeding the cloths into the finishing feeder (or the spreader) can be significantly increased from that of the conventional method which does not use the cloths separating device. In the conventional method, since the height of the stack of sheets is at first as high as about 70 cm and decreases as the sheets are pulled out, a worker first has to work in a stretched posture and at the end has to work in a bent-over posture, which imposes a large work burden on the worker. According to the cloths separating devices of the reference example and the embodiment, since the height of the stack of sheets is about 20 cm from the beginning, a worker can work comfortably while keeping an almost constant posture.

Figure 8:
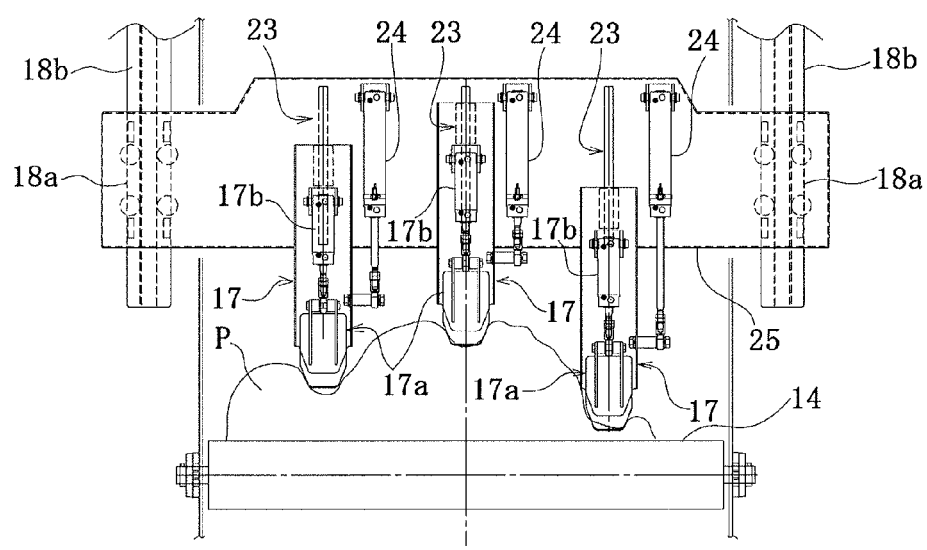
FIG. 8 is a front view showing a major part of a cloths pick-up mechanism in a modified example of the cloths separating device of the above embodiment.

Next, a modified example of the cloths separating device of the embodiment will be described in terms of changes from the embodiment. FIG. 8 is a front view showing a major part of the cloths pick-up mechanism 16 in the cloths separating device of this modified example. This cloths pick-up mechanism 16 includes: a plurality of, three for example, clamps 17 which are arrayed in the width direction of the cloths transport conveyor 14 and open and close grabbing parts 17a by air cylinders 17b respectively; the slide mechanism 18 as a clamp hoisting mechanism which moves up and down the slider 18a as a mobile member, on which the three clamps 17 are mounted, in an obliquely upper-lower direction; and linear guide mechanisms 23 and weight reduction cylinders 24 as a clamp height changing mechanism which change the height at which three clamps 17 are mounted on the slider 18a respectively.

The slide mechanism 18 has the two sliders 18a which support the three clamps 17 by means of a support plate 25 extending in the left-right direction in FIG. 8, two guide rails 18b which are located side by side in parallel to each other in the left-right direction in FIG. 8 and guide the upward and downward motion of the sliders 18a in an obliquely upper-lower direction, a motor 18c which drives the upward and downward motion of the sliders 18a in combination in the obliquely upper-lower direction, and the transmission mechanism 18d of a belt type, for example, which transmits the driving force of the motor 18c to the sliders 18a. The cloths P on the cloths transport conveyor 14 can be picked obliquely upward in a hanging state by holding a part of the cloths P on the cloths transport conveyor 14 with the three clamps 17 and moving these clamps 17 obliquely upward by the slide mechanism 18.

The linear guide mechanisms 23 guide the separate upward and downward motion of the three clamps 17 along the support plate 25 respectively by means of the sliders which are guided by guide rails. The weight reduction cylinders 24 have air inside the cylinders depressurized to a negative pressure, and apply a pull-up force separately to the three clamps 17 respectively, so that, as shown in FIG. 8, the three clamps 17, which are brought into contact with the cloths P on the cloths transport conveyor 14 by the downward motion of the support plate 25, each press the contact portion of the cloths P with a predetermined pressing force corresponding to the weight of the clamp 17 and the pull-up force of the weight reduction cylinder 24 while moving up and down according to the height of the contact portion of the cloths P. Thus, it is possible to hold the cloths P at three portions with the grabbing parts 17a of the three clamps 17, without the clamp 17, which first comes into contact with the cloths P, hindering the downward motion of the other clamps 17, so that the success rate of picking up the cloths P can be increased. In addition, it is possible to reliably hold the cloths P with the grabbing part 17a of any of the clamps 17, at whichever position the cloths P are located in the width direction of the cloths transport conveyor, so that the success rate of picking up the cloths P can be increased from this aspect as well.

Figure 9:
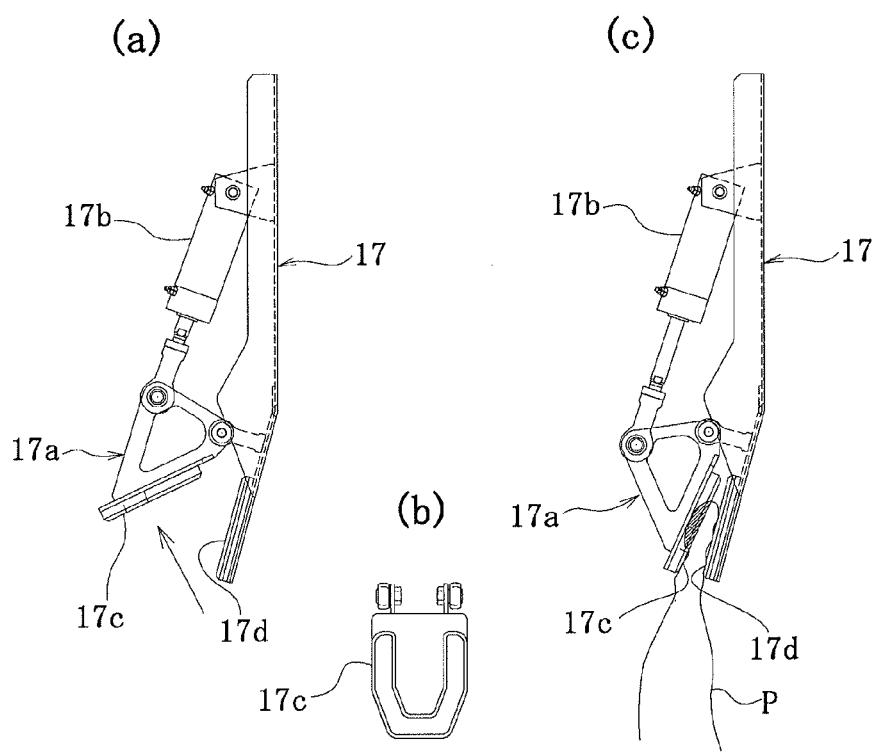
FIG. 9(*a*) is a side view showing a clamp of the cloths pick-up mechanism of the above modified example in a state where a grabbing part is open.

FIG. 9(a) is a side view showing the clamp 17 of the cloths pick-up mechanism 16 in the cloths separating device of this modified example in a state where the grabbing part 17a is open; FIG. 9(b) is a front view showing a protruding strip portion 17c of the grabbing part 17a of the clamp 17 as seen from the direction of the arrow in FIG. 9(a); and FIG. 9(c) is a side view showing the clamp 17 in a state where the grabbing part 17a is closed and the cloths P are held in it. As shown in FIGS. 9(a) and 9(c), the grabbing part 17a of the clamp 17 in this example has the movable protruding strip portion 17c which is rocked by the air cylinder 17b, and a fixed plate portion 17d which holds the cloths P between the movable protruding strip portion 17c and the fixed plate portion 17d. As shown in FIG. 9(b), the movable protruding strip portion 17c has a frame shape which is annularly closed or partially open, and in the example shown in FIG. 9(b), the movable protruding strip portion 17c has a substantially U-shape or a horseshoe shape with an open upper end.

Thus, as shown in FIG. 9(c), since the grabbing part 17a of each clamp 17 can release a part of the cloths P held between the movable protruding strip portion 17c and the fixed plate portion 17d to the inside of the frame-shaped movable protruding strip portion 17c, it is possible to engage the part of the cloths P, which is released to the inside, with the movable protruding strip portion 17c so as to prevent the cloths P being held from falling away. Instead of being provided with the fixed plate portion 17d, the grabbing part 17a may hold the cloths P with two movable protruding strip portions 17c.

Figure 10:
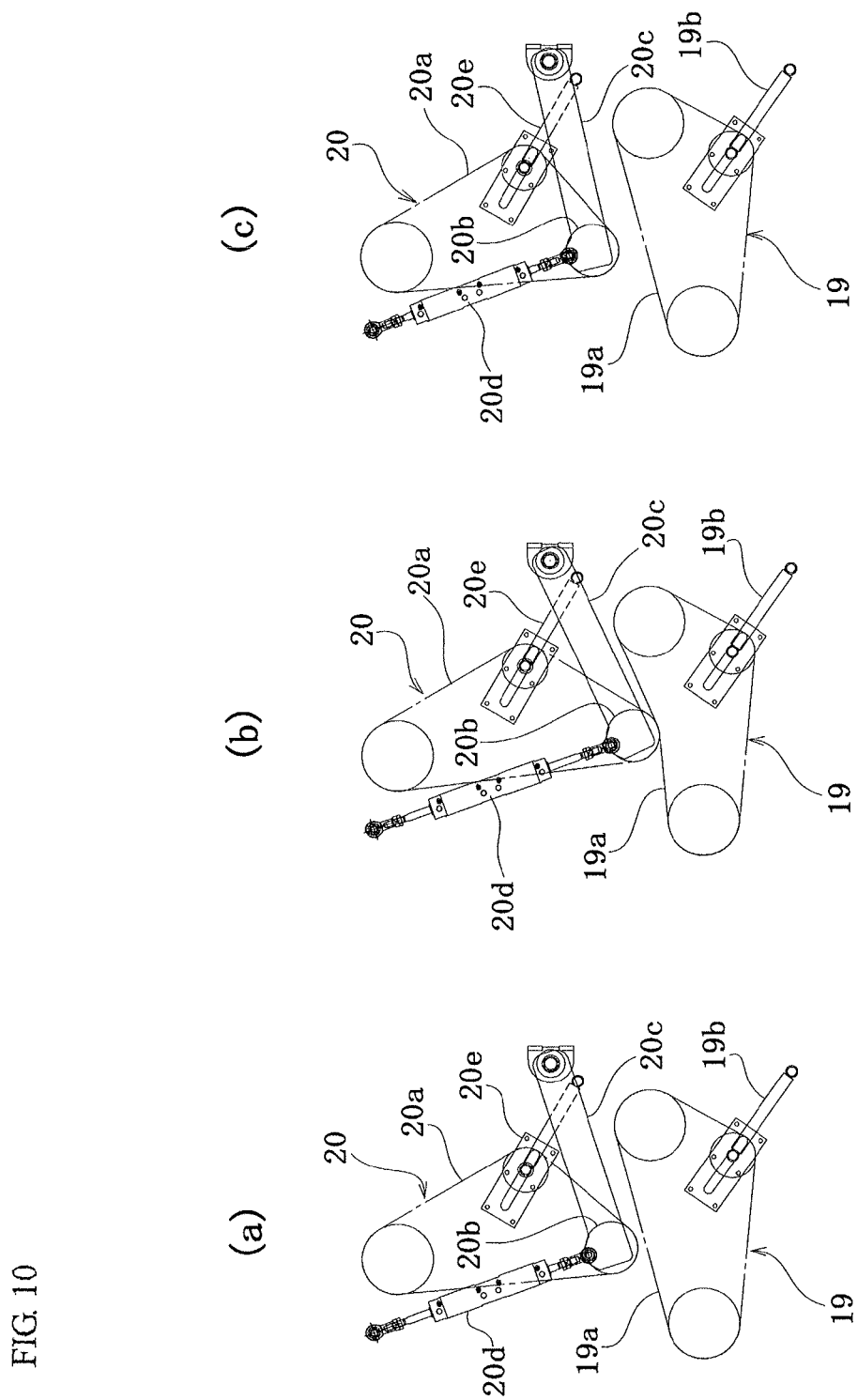
FIGS. 10(*a*), 10(*b*), and 10(*c*) are side views showing a pair of upper and lower compression conveyors in the above modified example, respectively in a state where the upper compression conveyor is at a normal position, a state where the upper compression conveyor is at an advanced position, and a state in which the upper compression conveyor is at a retracted position.

FIGS. 10(a), 10(b), and 10(c) are side views showing the pair of upper and lower compression conveyors of the cloths separating device of this modified example, respectively in a state where the upper compression conveyor 20 is at a normal position, a state where the upper compression conveyor 20 is at an advanced position, and a state where the upper compression conveyor 20 is at a retracted position. In this modified example, as with the foregoing embodiment, the conveyor belt 19a of the lower compression conveyor 19 is inclined slightly downward from the entrance-side end, which is the right end in FIG. 10, toward the exit-side end, while the conveyor belt 20a of the upper compression conveyor 20, which is wound around three rollers, is inclined steeply downward from the entrance-side end, which is the right end in FIG. 10, toward the exit-side end. Thus, the entrance-side end of the compression conveyors 19, 20 is located so as to face a middle part of the cloths P picked up in a hanging state, and the clearance between the compression conveyors 19, 20 becomes narrower from the entrance-side end toward the exit-side end.

Further, in the cloths separating device of this modified example, the tension of the conveyor belt 19a of the lower compression conveyor 19 of the pair of compression conveyors is adjusted by a tensioner 19b, and an exit-side roller 20b, which supports the conveyor belt 20a of the upper compression conveyor 20, can move up and down by being supported by a support arm 20c so as to be able to rock up and down. The upper compression conveyor 20 is provided with an air cylinder 20d as belt urging means for urging the conveyor belt 20a by means of the exit-side roller 20b toward the lower compression conveyor 19, and a tensioner 20e which adjusts the tension of the conveyor belt 20a.

Thus, even when the cloths P are thin or the amount of cloths P is small, it is possible to bring the conveyor belt 20a of the upper compression conveyor 20 closer to the lower compression conveyor 19 by urging the conveyor belt 20a by the air cylinder 20d toward the conveyor belt 19a of the lower compression conveyor 19, and send out the cloths P from the exit side while firmly compressing the cloths P against the conveyor belt 19a of the lower compression conveyor 19. On the other hand, even when the cloths P are thick or the amount of cloths P is large, it is possible to urge the conveyor belt 20a of the upper compression conveyor 20 toward the conveyor belt 19a of the lower compression conveyor 19 by the air cylinder 20d to thereby separate the conveyor belt 20a from the conveyor belt 19a of the lower compression conveyor 19 by a reaction force from the cloths P, so that clogging with the cloths P between the upper and lower compression conveyors 20, 19 can be prevented.

FIG. 11(a) and FIG. 11(b) are explanatory diagrams sequentially illustrating the actions of the cloths separating device of this modified example. In the cloths separating device of this modified example, in the same manner as the foregoing reference example and embodiment, the bundle of cloths F fed from the hopper 2 is preliminarily detangled by the preliminary detangling conveyor 7 and is mainly detangled by the main detangling conveyor 6, and the cloths P detangled from the bundle of cloths F and falling from the main detangling conveyor 6 onto the cloths transport conveyor 8 and the cloths P falling through the gap G are evened out so as not to gather in one place and sequentially transported by the cloths transport conveyor 8 and the cloths transport conveyor 14 substantially evenly or by about tens.

Figure 11:
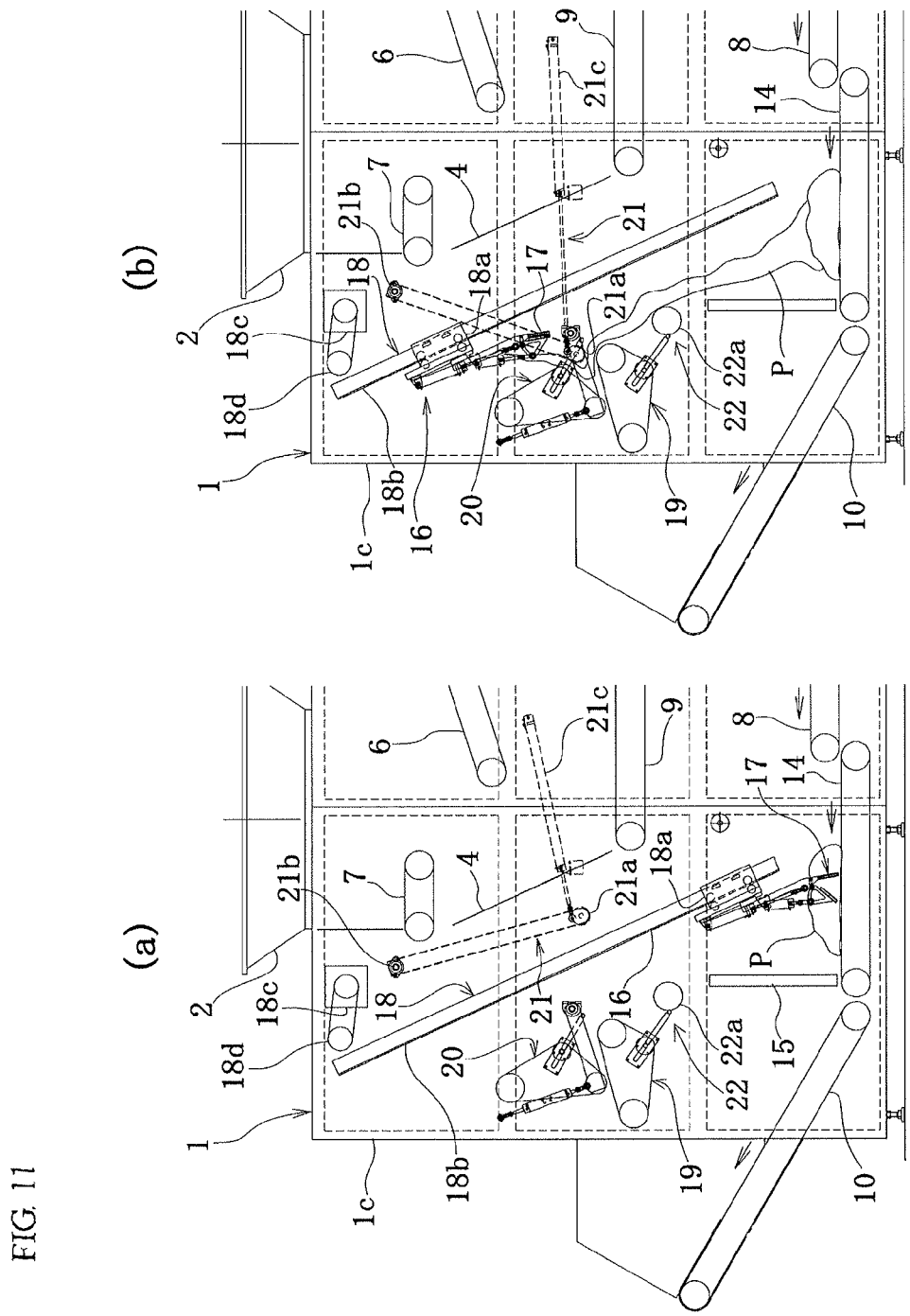
FIGS. 11(*a*) and 11(*b*) are explanatory diagrams sequentially illustrating actions of the cloths separating device of the above modified example.

As shown in FIG. 11(a), in the cloths separating device of this modified example, the cloths pick-up mechanism 16 holds a part (about one to three pieces) of the cloths P on the cloths transport conveyor 14 with the three clamps 17, and moves these clamps 17 obliquely upward by the slide mechanism 18 to pick the part of the cloths P on the cloths transport conveyor 14 obliquely upward in a hanging state. As shown in FIG. 11(b), the cloths push-in mechanism 21 swings the push-in roller 21a by the air cylinder 21c to the left side in FIG. 11 through the gap between the two guide rails 18b, and the push-in roller 21a pushes a middle part of the cloths P hanging from the three clamps 17 into the entrance of the compression conveyors 19, 20. The compression conveyors 19, 20 tuck the cloths P between the conveyor belts and send the cloths P to the exit on the left side in FIG. 11, while the cloths rear end pull-up mechanism 22 pulls up the rear end, namely, the lower end, of the cloths P by the pull-up roller 22a and separates the rear end of the cloths P from the cloths pick-up mechanism 16, so that the cloths P fall from the exit of the compression conveyors 19, 20 onto the cloths carry-out conveyor 10 and are carried out by the cloths carry-out conveyor 10. Meanwhile, the slide mechanism 18 moves the three clamps 17 obliquely downward to hold the next cloths P, and the cloths push-in mechanism 21 swings the push-in roller 21a by the air cylinder 21c to the right side in FIG. 11 to return it to the original position as shown in FIG. 11(a).

A presser plate (not shown) which swings with the push-in roller 21a is provided between the push-in roller 21a and the support shaft 21b, and when the push-in roller 21a pushes a middle part of the cloths P into the entrance of the compression conveyors 19, 20, the presser plate works in conjunction with the push-in roller 21a to push in the middle part of the cloths P, and prevents the middle part of the cloths P from coming around behind the push-in roller 21a and tangling on the push-in roller 21a.

Therefore, according to the cloths separating device of this modified example, in the same manner as the foregoing reference example and embodiment, it is possible to automatically disentangle the bundle of cloths F consisting of a plurality of cloths tangled with one another and carry out the cloths substantially evenly or by about tens, so that the time and labor required for manually disentangling the bundle of cloths to some extent beforehand can be reduced.

According to the cloths separating device of this modified example, in the same manner as the foregoing embodiment, the cloths pick-up mechanism 16 holds a part of the cloths P on the cloths transport conveyor 14 and picks the cloths P obliquely upward in a hanging state, and the cloths push-in mechanism 21 pushes a middle part of the cloths P into the entrance of the pair of upper and lower compression conveyors 19, 20, of which the entrance is located so as to face the middle part of the cloths P picked up in a hanging state, the clearance between the compression conveyors becoming narrower from the entrance toward the exit, and the cloths carry-out conveyor 10 sequentially carries out the cloths P discharged from the exit of the compression conveyors 19, 20. Thus, it is possible to further detangle the cloths P on the cloths transport conveyor 14 and carry out the cloths P by about ones to threes or by about tens by the cloths carry-out conveyor 10. Moreover, since the cloths pick-up mechanism 16 picks the cloths P obliquely upward in a hanging state, the cloths pick-up mechanism 16 can move down to pick up the next cloths P without interfering with any cloth P that may remain hanging at the entrance of the compression conveyors 19, 20, so that the pick-up cycle time can be reduced.

According to the cloths separating device of this modified example, when the cloths pick-up mechanism 16 picks up the cloths P, the three clamps 17 each press the contact portion of the cloths P with a predetermined pressing force corresponding to the weight of the clamp 17 and the pull-up force of the weight reduction cylinder 24 while moving up and down according to the height of the contact portion of the cloths P, so that it is possible to hold the cloths P at three portions with the grabbing parts 17a of the three clamps 17 and thereby to increase the success rate of picking up the cloths P. Moreover, it is possible to reliably hold the cloths P with the grabbing part 17a of any of the clamps 17, at whichever position the cloths P are located in the width direction of the cloths transport conveyor, so that the success rate of picking up the cloths P can be increased from this aspect as well.

According to the cloths separating device of this modified example, the grabbing part 17a of each clamp 17 can release a part of the cloths P held between the movable protruding strip portion 17c and the fixed plate portion 17d to the inside of the frame-shaped movable protruding strip portion 17c, so that it is possible to engage the part of the cloths P, which is released to the inside, with the movable protruding strip portion 17c so as to prevent the cloths P being held from falling away.

According to the cloths separating device of this modified example, even when the cloths P are thin or the amount of cloths P is small, it is possible to bring the conveyor belt 20a of the upper compression conveyor 20 closer to the lower compression conveyor 19 by the air cylinder 20d and send out the cloths P from the exit side while firmly compressing the cloths P against the conveyor belt 19a of the lower compression conveyor 19. On the other hand, even when the cloths P are thick or the amount of cloths P is large, it is possible to separate the conveyor belt 20a of the upper compression conveyor 20 from the conveyor belt 19a of the lower compression conveyor 19 by the reaction force from the cloths P against the urging force of the air cylinder 20d, so that clogging with the cloths P between the upper and lower compression conveyors 20, 19 can be prevented.

According to the cloths separating device of this modified example, since the cloths rear end pull-up mechanism 22 pulls up the rear end, namely, the lower end, of the cloths P picked up in a hanging state and separates the rear end of the cloths P from the cloths pick-up mechanism 16, the clamps 17 of the cloths pick-up mechanism 16 can move down to pick up the next cloths P while more reliably avoiding interference with any cloth P that may remain hanging at the entrance of the compression conveyors 19, 20, so that the pick-up cycle time can be further reduced.

Having been described on the basis of the embodiment shown in the drawings, the present invention is not limited to the above-described embodiment but can be appropriately modified within the scope described in the claims. For example, in the above-described embodiment, the preliminary detangling member is the preliminary detangling conveyor 7, but the preliminary detangling member may be a rotatable roller or a rod material with a smooth surface. In the above-described embodiment, the controller controls the operation of the main detangling conveyor 6 using a signal output from the load cell 12 which detects changes in weight of the bundle of cloths F on the main detangling conveyor 6, but the controller may control the operation of the main detangling conveyor 6 using a current value of the driving motor of the main detangling conveyor 6, or the controller may control the operation of the main detangling conveyor 6 so that the height of the bundle of cloths F decreases gradually, by detecting the height of the bundle of cloths F at the exit-side end (at the right end in FIG. 1) of the main detangling conveyor 6 by means of a line sensor (which is a large number of optical sensors in a linear array) provided at the exit-side end so as to extend in the upper-lower direction.

In the above-described embodiment, all of the main detangling conveyor 6, the preliminary detangling conveyor 7, the cloths transport conveyors 8, 14, the intermediate conveyor 9, the carry-out conveyor 10, and the compression conveyors 19, 20 consist of belt conveyor, but any one or more of, or all of these conveyors may be a conveyor of other type. In the above-described embodiment, only one preliminary detangling member is provided, but a plurality of preliminary detangling members may be provided at different heights in order to perform a plurality of times of preliminary detangling. In the above-described embodiment, the cloths push-in mechanism uses the rotatable push-in roller, but a rod material with a smooth surface may be used. In the above-described embodiment, the bundle of cloths F is fed from the transport bag B into the cloths separating device, the bundle of cloths F may be fed from another transport system, for example, a belt conveyor, into the cloths separating device.

In the above-described modified example, the number of clamps 17 is three, but instead the number of clamps 17 may be two or four or more, and three or more clamps 17 may be disposed in a plurality of rows, not only in the width direction but also in the transport direction of the cloths transport conveyor 14. In the above-described modified example, the clamp height changing mechanism changes the heights of the clamps 17 by the weight reduction cylinder 24, but instead the distance between the support plate 25 having moved down to a predetermined position and each of a plurality of clamped portions of the cloths P may be measured with a non-contact distance sensor using a laser, for example, and according to the measured distance, the heights of the plurality of clamps may be changed by an air cylinder, for example.

INDUSTRIAL APPLICABILITY

Thus, according to the cloths separating device of the present invention, it is possible to automatically disentangle a bundle of cloths consisting of a plurality of cloths tangled with one another, so that the time and labor required for manually disentangling the bundle of cloths to some extent beforehand can be reduced.

REFERENCE SIGNS LIST

1 Casing
1a, 1c Frame
1b Side plate
2 Hopper
3, 4, 5 Guide plate
6 Main detangling conveyor
7 Preliminary detangling conveyor
8, 14 Cloths transport conveyor
9 Intermediate conveyor
10 Cloths carry-out conveyor 11 Limiting roller
12 Load cell
13 Control panel
15 Partition plate
16 Cloths pick-up mechanism
17 Clamp
17a Grabbing part
17b Air cylinder
17c Movable protruding strip portion
17d Fixed plate portion
18 Slide mechanism
18a Slider
18b Guide rail
18c Motor
18d Transmission mechanism
19, 20 Compression conveyor
19a, 20a Conveyor belt
19b, 20e Tensioner
20b Exit-side roller
20c Support arm
20d Air cylinder
21 Cloths push-in mechanism
21a Push-in roller
21b Support shaft
21c Air cylinder
22 Cloths rear end pull-up mechanism
22a Pull-up roller
23 Linear guide mechanism
24 Weight reduction cylinder
25 Support plate
B Transport bag
F Bundle of cloths
G Gap
P Part of cloths in a bundle of cloths

The invention claimed is:

1. A cloths separating device which disentangles a bundle of cloths comprising a plurality of cloths tangled with one another, the cloths separating device comprising:
   a cloths pick-up mechanism which holds a part of cloths on a cloths transport conveyor and picks the part of cloths, in a hanging state, obliquely upward;
   a pair of upper and lower compression conveyors whose entrance is located so as to face a middle part of the cloths picked up in a hanging state, the clearance between the compression conveyors becoming narrower from the entrance toward an exit;
   a cloths push-in mechanism which pushes the middle part of the cloths into the entrance of the compression conveyors; and
   a cloths carry-out conveyor which carries out the cloths discharged from the exit of the compression conveyors;
   wherein the cloths pick-up mechanism includes:
      a plurality of clamps which are arrayed in the width direction of the cloths transport conveyor and open and close respective grabbing parts;
      a clamp hoisting mechanism which moves a mobile member, on which the plurality of clamps are mounted, up and down in an obliquely upper-lower direction; and
      a clamp height changing mechanism which changes the height at which each of the plurality of clamps is mounted on the mobile member.

2. The cloths separating device according to claim 1, wherein the grabbing part has a frame-shaped protruding strip portion which is annularly closed or partially open.

3. The cloths separating device according to claim 2, wherein
   an exit-side roller which supports the conveyor belt of the upper compression conveyor of the pair of upper and lower compression conveyors can move up and down, and
   the upper compression conveyor is provided with belt urging means for urging the conveyor belt by means of the exit-side roller toward the lower compression conveyor.

4. The cloths separating device according to claim 2, further comprising a cloths rear end pull-up mechanism which pulls up the rear end of the cloths picked up in a hanging state and separates the rear end of the cloths from the cloths pick-up mechanism.

5. The cloths separating device according to claim 1, wherein
   an exit-side roller which supports the conveyor belt of the upper compression conveyor of the pair of upper and lower compression conveyors can move up and down, and
   the upper compression conveyor is provided with belt urging means for urging the conveyor belt by means of the exit-side roller toward the lower compression conveyor.

6. The cloths separating device according to claim 1, further comprising a cloths rear end pull-up mechanism which pulls up the rear end of the cloths picked up in a hanging state and separates the rear end of the cloths from the cloths pick-up mechanism.

7. A cloths separating device which disentangles a bundle of cloths comprising a plurality of cloths tangled with one another, the cloths separating device comprising:
   a cloths pick-up mechanism which holds a part of cloths on a cloths transport conveyor and picks the part of cloths, in a hanging state, obliquely upward;
   a pair of upper and lower compression conveyors whose entrance is located so as to face a middle part of the cloths picked up in a hanging state, the clearance between the compression conveyors becoming narrower from the entrance toward an exit; and
   a cloths push-in mechanism which pushes the middle part of the cloths into the entrance of the compression conveyors;
   wherein the cloths pick-up mechanism includes:
      a plurality of clamps which are arrayed in the width direction of the cloths transport conveyor and open and close respective grabbing parts;
      a clamp hoisting mechanism which moves a mobile member, on which the plurality of clamps are mounted, up and down in an obliquely upper-lower direction; and
      a clamp height changing mechanism which changes the height at which each of the plurality of clamps is mounted on the mobile member.

8. The cloths separating device according to claim 7, wherein the grabbing part has a frame-shaped protruding strip portion which is annularly closed or partially open.

9. The cloths separating device according to claim 8, wherein
   an exit-side roller which supports the conveyor belt of the upper compression conveyor of the pair of upper and lower compression conveyors can move up and down, and
   the upper compression conveyor is provided with belt urging means for urging the conveyor belt by means of the exit-side roller toward the lower compression conveyor.

10. The cloths separating device according to claim 8, further comprising a cloths rear end pull-up mechanism which pulls up the rear end of the cloths picked up in a hanging state and separates the rear end of the cloths from the cloths pick-up mechanism.

11. The cloths separating device according to claim 7, wherein
- an exit-side roller which supports the conveyor belt of the upper compression conveyor of the pair of upper and lower compression conveyors can move up and down, and
- the upper compression conveyor is provided with belt urging means for urging the conveyor belt by means of the exit-side roller toward the lower compression conveyor.

12. The cloths separating device according to claim 7, further comprising a cloths rear end pull-up mechanism which pulls up the rear end of the cloths picked up in a hanging state and separates the rear end of the cloths from the cloths pick-up mechanism.

* * * * *